United States Patent [19]

Pawelzik

[11] Patent Number: 4,621,659
[45] Date of Patent: Nov. 11, 1986

[54] MIXING VALVE

[75] Inventor: Manfred Pawelzik, Soest, Fed. Rep. of Germany

[73] Assignee: Friedrich Grohe Armaturenfabrik GmbH & Co., Hemer, Fed. Rep. of Germany

[21] Appl. No.: 824,623

[22] Filed: Jan. 31, 1986

[30] Foreign Application Priority Data

Feb. 5, 1985 [DE] Fed. Rep. of Germany ....... 3503793

[51] Int. Cl.$^4$ .............................................. F16K 11/06
[52] U.S. Cl. .............................. 137/625.17; 137/625.4
[58] Field of Search ............ 137/625.17, 625.4, 625.41

[56] References Cited

U.S. PATENT DOCUMENTS

| | | | |
|---|---|---|---|
| 3,384,119 | 5/1968 | Manoogian | 137/625.17 |
| 3,882,897 | 5/1975 | Manoogian et al. | 137/625.4 |
| 3,965,936 | 6/1976 | Lyon | 137/625.17 |
| 4,088,153 | 5/1978 | Paasikivi | 137/625.4 X |
| 4,327,758 | 5/1982 | Uhlmann | 137/625.17 |
| 4,327,771 | 5/1982 | Nikolayczik | 137/625.4 |

FOREIGN PATENT DOCUMENTS 3244121 5/1984 Fed. Rep. of Germany .

Primary Examiner—Alan Cohan
Assistant Examiner—John A. Rivell
Attorney, Agent, or Firm—Karl F. Ross; Herbert Dubno

[57] ABSTRACT

A mixing valve for sanitary operations comprises a valve seat disk having two inlet passage openings and a controlling disk held against the valve seat disk adjustable by a handle, so that the relative proportions of the fluids mixed are controllable by rotation of the controlling disk and the flow rate of the mixed fluid is controlled by a displacement of the controlling disk, wherein the two inlet passage openings for the fluids mixed are formed symmetrically positioned in one half of the valve seat disk, each of the two inlet passage openings being formed as an arcuate segment positioned on a circular arc, and wherein a transfer passage formed in the controlling disk is brought into overlap with the inlet passage openings adjacent an arc shaped front edge of the transfer passage. To improve the control of the proportions of the fluids mixed the inner sides of each of the inlet passage openings have a constriction extending a distance of substantially one-third of the length of the arcuate segment corresponding to each of the inlet passage openings, and the constriction is positioned a distance of substantially 0.4 of the length of the arcuate segment from the front side of the inlet passage openings adjacent the symmetry axis of the valve seat disk.

6 Claims, 7 Drawing Figures

MIXING VALVE

FIELD OF THE INVENTION

My present invention relates to mixing valves for blending and mixing the flows of two miscible fluids, and, more particulary, to mixing valves for mixing a cold water flow and a warm water flow for sanitary fixtures.

BACKGROUND OF THE INVENTION

Mixing valves used for mixing two fluids for sanitary fixtures, particularly warm and cold water, can comprise a valve seat disk having two inlet passage openings and a controlling disk held against the valve seat disk and adjustable by a handle, so that the relative proportions of the fluids mixed are controllable by rotation of the controlling disk, and the total flow rate of the mixed fluid is controlled by a somewhat linear displacement of the controlling disk.

The two inlet passage openings for the fluids to be mixed are formed symmetrically in one half of the valve seat disk. Each of the two passage openings is formed as an arcuate segment on a circular arc. Transfer passage formed in the controlling disk is brought into overlapping relationship with the inlet passage openings adjacent an arc shaped front edge of the transfer passage.

In mixing valves used to control the water temperature in a sanitary fixture it is essential between the extreme "cold" and "hot" positions to have a comparatively large range of swing or pivot angle for the "comfort" temperature range of between 30° to 45° C. With these valves the temperature range can easily be brought close to the body temperature of the user and comparatively exactly controlled, but even slight deviations of from 1° C. to 2° C. from the desired temperature are noticeable.

In the known mixing valves, the adjustment of the relative proportion of the mixed fluids, e.g. cold and warm water, is substantially proportional to the rotational angle of the handle, so that in a total pivot angle or swing of say 110° only a pivot angle of about 20° is available for a mixed water temperature range of from 30° to 45° C. and thus sensitive fine adjustment is made only with difficulty.

German Patent DE-OS No. 32 44 121 describes a mixing valve in which a more sensitive fine adjustment of the relative proportions of the fluids mixed is attained in the preferred temperature range. In this mixing valve structure the rotation axis of the controlling disk is arranged eccentric to the valve seat disk axis. Therefore, among other requirements the valve housing must be constructed with supporting receptacles eccentric to each other for the valve seat disk and the controlling disk.

OBJECTS OF THE INVENTION

It is an object of my invention to provide an improved mixing valve for mixing two fluids whereby the drawbacks described above would be obviated.

It is also an object of my invention to provide a simpler and more easily constructed sanitary fixture with which a finer adjustment of the relative proportions of the fluids mixed in the outflow is possible.

It is also an object of my invention to provide a mixing valve for mixing warm and cold water in a sanitary fixture, wherein the relative adjustment angle range in the comfort zone is a maximum and substantially greater than 20°, but the mixing valve does not have unusual or difficult-to-construct structures like eccentrically positioned valve seat disks or controlling disks.

Another object of my invention is to provide especially precise fine adjustment of water temperature in the range of 30° to 45° C.

SUMMARY OF THE INVENTION

These objects and others, which will become more readily apparent hereinafter, are attained in accordance with my invention in a mixing valve for operation in sanitary conditions comprising a valve seat disk having two inlet passage openings and a controlling disk held against the valve seat disk adjustable by hand, so that the relative proportions of the fluids mixed are controllable by rotation of the controlling disk. The total flow rate of the mixed fluid is controllable by a generally linear displacement of the controlling disk two inlet passage openings for the fluids to be mixed being formed symmetrically in one half of the valve seat. Each of the two inlet passage openings is formed as an arcuate segment positioned on a circular arc. A transfer passage formed in the controlling disk is brought into overlapping relation with the inlet passage openings adjacent an arc shaped front edge of the transfer passage.

According to our invention the inner sides of each of the inlet passage openings have a constriction extending a distance of substantially one third the length of the arcuate segment corresponding to each of the inlet passage openings, and each constriction is spaced a distance of substantially 0.4 of the length of the arcuate segment corresponding to each of the inlet passage openings from a front side of each of the inlet passage openings proximate to the symmetry axis of the valve seat disk.

According to a further feature of our invention the valve seat disk is substantially circular and the centers of curvature of both of the inlet passage openings are identical and offset a distance from the center of the valve seat disk on the other opposing half of the controlling disk in a direction parallel to the symmetry axis.

Advantageously according to my invention each of the inlet passage openings at the front side adjacent the symmetry axis has a maximum width and is constricted in the direction of the other opposing side of the inlet passage openings, wherein the other opposing sides of both of the inlet passage openings have a width, which is substantially 0.75 of the maximum width and the width of the constriction of a suitably narrowed shape is subtantially 0.5 to 0.3 of the maximum width.

Also according to a further desirable feature the center of curvature of both of the inlet passage openings is displaced substantially 1 mm from the center of the valve seat disk, and the radius of the arcuate segment of the inlet passage openings is substantially 13 mm, wherein both of the front sides of the inlet passage openings form a semicircle on the outer edges thereof, and each of the arcuate segments corresponding to each of the generally kidney-shaped inlet passage openings extend from 5° to 75° of arc as measured from the symmetry axis, and the maximum width is about 3.6 mm.

Furthermore, the valve seat disk advantageously has an outlet passage opening for the rearward flow of mixed fluid, and a controlling disk, in which a transfer passage is formed as a surface passage for connecting selectively the inlet passage openings and the output passage opening. The transfer passage has a trapezoidally shaped longitudinal cross section, which is narrowed in the direction of the outlet passage opening.

Other advantageous features of our invention include the following: the maximum breadth of the transfer passage is substantially 15 mm, and the arc shaped front edge of the transfer passage has a radius of substantially 10 mm, whose corners are rounded with a radius of substantially 2.5 mm, and the maximum distance to the pivot axis of the controlling disk is substantially 9.5 mm, wherein the side walls of the transfer passage are connected to the front edge with an inclination of substantially 7.5° to the center axis.

With the above features according to my invention the temperature of the mixed fluid flow output in the range from 30° to 45° C., the so-called comfort zone, can be more accurately and conveniently adjusted, since the range of the adjustment swing angle corresponding to this temperature range can be raised to 34° of the total range of 110° of angle.

BRIEF DESCRIPTION OF THE DRAWING

The above and other objects, features, and advantages of my invention will become more readily apparent from the following description, reference being made to the accompanying drawing, in which.

SPECIFIC DESCRIPTION

Figure 1:
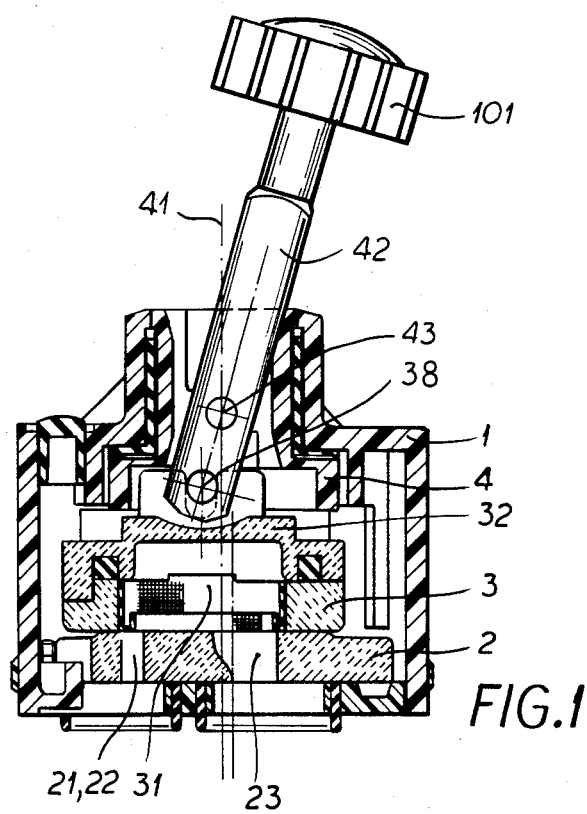
FIG. 1 is an axial cross sectional view through a preferred embodiment of a mixing valve according to my invention.

The mixing valve of the invention is mounted in a cylindrical valve housing 1 attached to a structural unit, which can be completely mounted in a sanitary fixture or the like. In the bottom of the valve housing 1 a valve seat disk 2 of ceramic material is supported fixed in position and has an inlet passage opening 21 for cold water and an inlet passage opening 22 for warm water as well as an outlet passage opening 23 for mixed water, which are connectable to suitable conduction passages in the sanitary fixture, which are not shown in the drawing.

A controlling disk 3 with a transfer passage 31 made from ceramic material is mounted on the valve seat disk 2. Both disks 2 and 3 bear with microfinished surfaces on each other, so that a water tight seal is guaranteed.

The top side of a controlling disk 3 opposite the side of the controlling disk 3 contacting the valve seat disk 2 is mounted and sealed according to the shape of these parts with a cover and guide cap 32, thus forming a top on the transfer passage 31, which acts as a smooth passage wall or forms a mixing chamber.

The cover and guide cap 32 is engaged on the other side by a rotating member 4 mounted rotatably in the valve housing 1, wherein a twin armed lever 42 is mounted in this rotating body 4 on its first rotation axis 41, which besides the usual rotational motion can be inclined or pivoted about a second rotation or tilt axis 43 lying perpendicular to the first rotation axis 41.

The twin armed or double-arm lever 42 is additionally connected with its inside lever arm with the cover and guide cap 32 in the vicinity of the pivot joint axis 38. The lever 42 can experience, for example, by a handle 101, an inclination or tilting, so that cover and guide cap 32 with the controlling disk 3 is pushed radially to the valve seat disk 2, whereby the fluid flow rate metering occurs. By a rotation of the lever 42 and rotational body 4 the cover the guide cap 32 together with the control disk 3 is movede suitably toward the valve seat disk 2, whereby the proportions of wram and cold water in the mixture are controlled.

Figure 2:
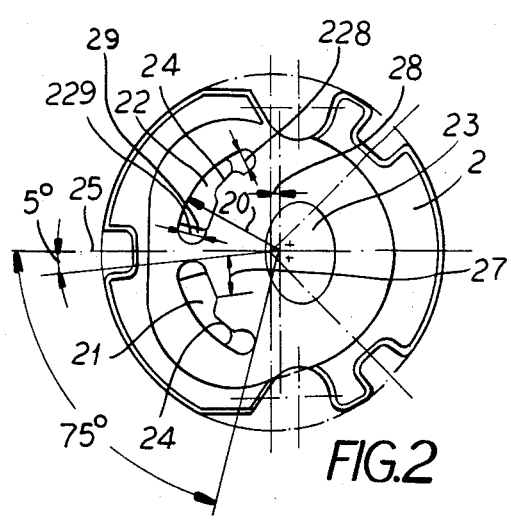
FIG. 2 is a top plan view of the valve seat disk of the mixing valve according to FIG. 1.

The valve seat disk 2, is, as can be seen especially from FIG. 2, substantially circular, the inlet passage openings 21 and 22 being mounted symmetrically on one half of the valve seat disk 2, while on the other opposing half outlet passage opening 23 for the rearward flow of mixed water is positioned. The inlet passage openings 21 and 22 are formed on a circular arc with a radius 20 of about 13 mm, wherein the center point of the circular arc is displaced a distance of about 1 mm on the other opposite half of the valve seat 2.

Both inlet passage openings 21 and 22 extend from the symmetry axis 25 from 5° to 75° of arc. The inlet passage openings 21 and 22 positioned on the circular arc with radius 20 have a maximum width 229 of 2.6 mm on the front side 29 adjacent the symmetry axis 25, and are narrowed on the side lying opposite this front side 29, wherein the width 228 of this opposite side amounts to about 0.75 of the maximum width.

On the inside of the inlet passage opening 21 or 22 a constriction 24 of about one third of the length of the arc segment corresponding to an inlet passage opening 21 or 22 is formed, wherein the constriction 24 begins at a distance 27 of approximately 0.4 of the length of the arcuate segment of the inlet passage opening 21 or 22 from the side adjacent the symmetry axis 25. The sides of the passage openings 21 and 22 are formed semicircular on their outflow sides.

Figure 3:
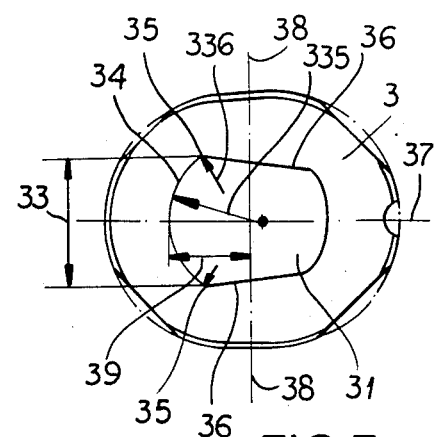
FIG. 3 is a bottom plan view of a controlling disk of the mixing valve according to FIG. 1.

The controlling disk 3 is, as shown in FIG. 3, provided with a transfer passage 31 forming a smooth opening or port symmetric to the center axis 37. In the vicinity of the inlet passage opening 21 and 22 the transfer passage 31 is bounded by an arc shaped front edge 34, which has a maximum distance 39 from the pivot axis 38 of about 9.5 mm, wherein the radius 335 of the arc shaped front edge 34 is about 10 mm. The maximum breadth 33 of the front edge 34 is about 15 mm, and the corners 35 of the front edge 34 are rounded with a radius 336 of about 2.5 mm. The side walls 36 linearly connect to both corners 35 of the front edge 34 and have an inclination of about 7.5° to the center axis 37. In the vicinity of the outlet passage opening 23 for the rear flow of the mixed water the transfer passage 31 is so formed that in each valve position an adequate cross section for the rearward flow of mixed fluid is guaranteed.

Figure 4:
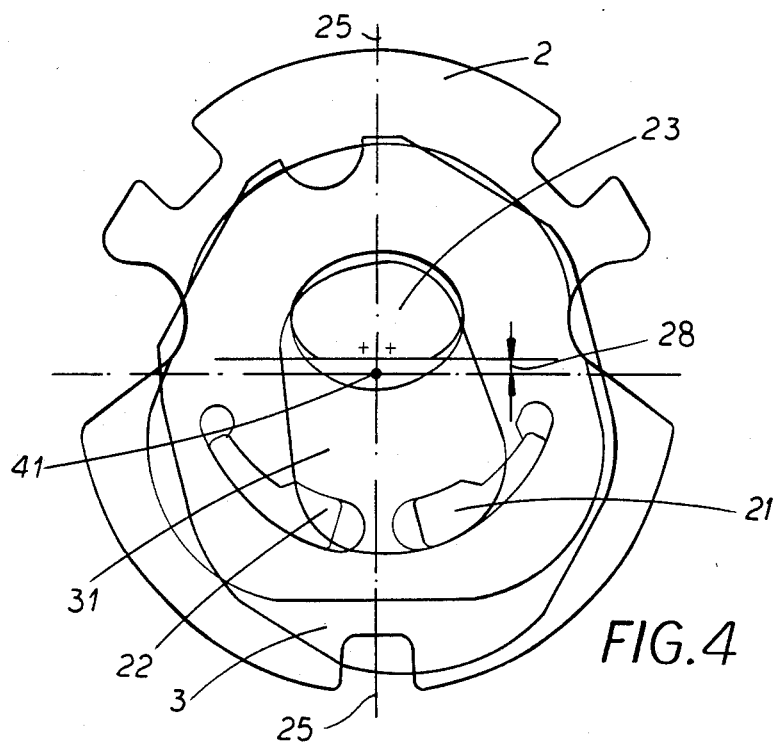
FIG. 4 is a top plane view of both the valve seat disk and controlling disk of the mixing valve according to FIG. 1, wherein both disks are oriented in positions (at an adjustment swing angle of 0°), in which a maximum flow and an equal mixing of both warm and cold water occurs.
Figure 5:
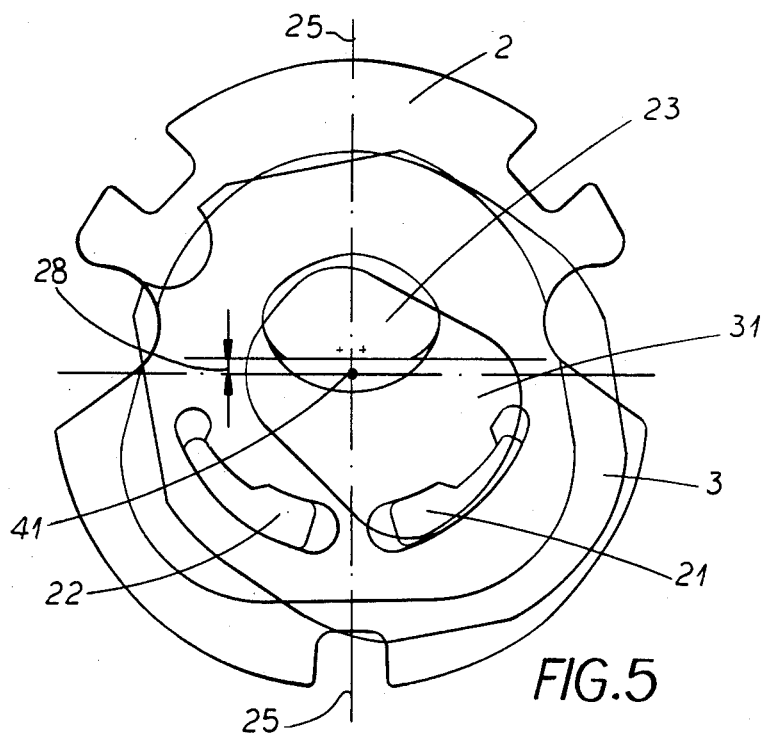
FIG. 5 is another top plan view of both the valve seat disk and controlling disk similar to FIG. 4, wherein both disks are oriented in positions (at an adjustment swing angle of 55°), in which the cold water control is completely open.

In FIGS. 4 and 5 top views of both the valve seat disk 2 and the controlling disk 3 are given showing how the inlet passage openings 21 and 22 coincide with the transfer passage 31 in two different adjustment swings of the disks 2 and 3. The adjustment swing angle controls the adjustment swing of the disks 2 and 3 and thus the proportion of warm and cold water admitted to the mixed overflow. An accurate and complete study of the relationships of outflow temperature and flow rate versus adjustment swing angle is summarized in FIGS. 6 and 7.

Figure 6:
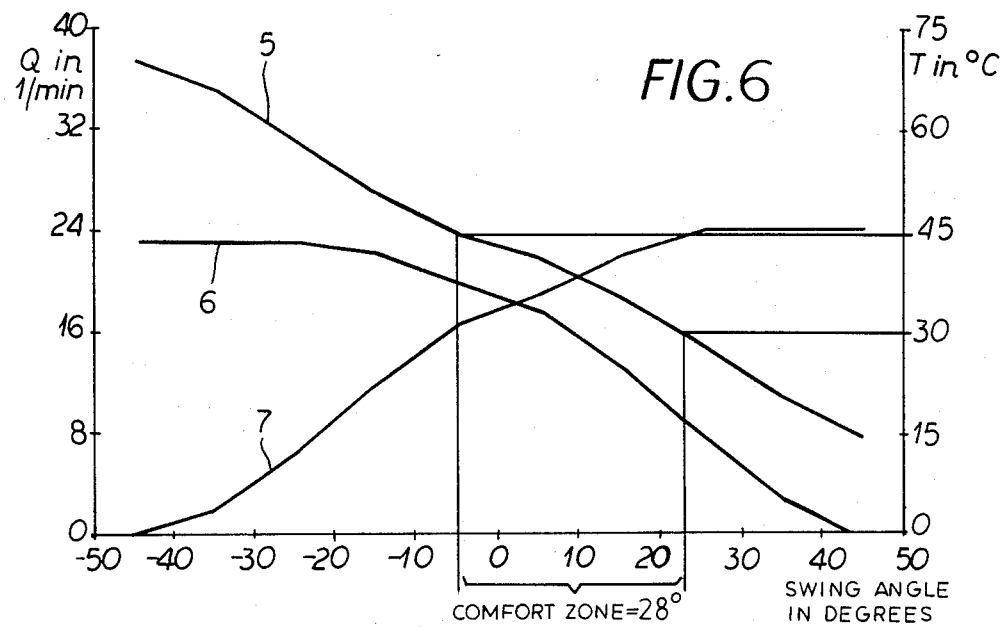
FIG. 6 is a graph in which the total fluid flow and mixed water temperature are reported versus the adjustment swing or pivot angle of the handle), as they have been measured in a mixing valve according to my invention with concentrically positioned openings.
Figure 7:
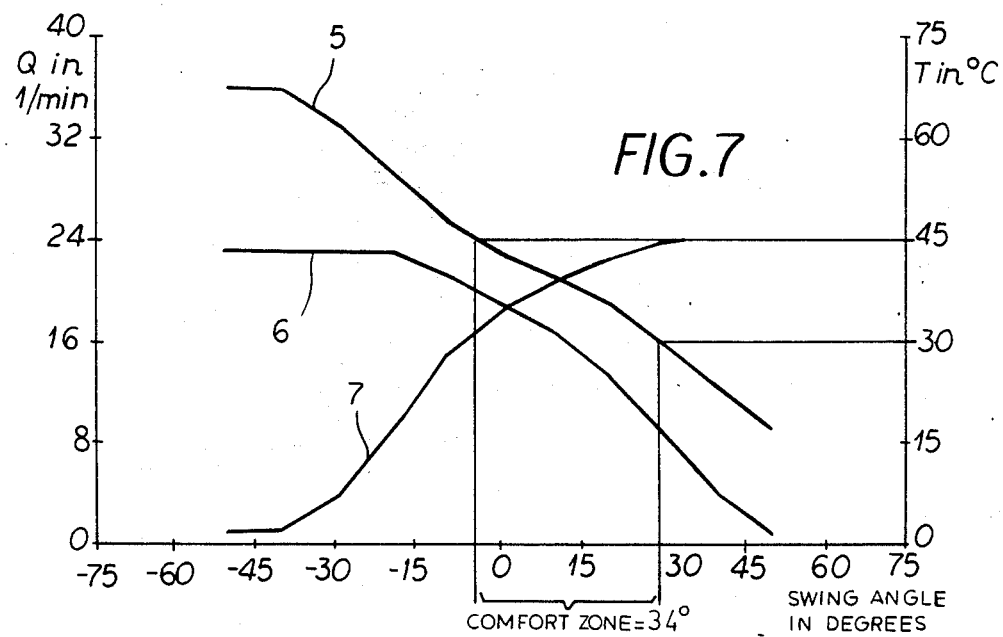
FIG. 7 is a graph in which the total water flow and mixed water temperature are reported versus the adjustment swing angle, as they have been measured in a mixing valve according to our invention with eccentrically positioned openings.

In FIG. 6, the above-described mixing valve having a zero displacement or, that is, a mixing valve, in which the inlet passage openings 21 and 22 are displaced an amount equal to zero, in its mixing configuration is described.

The values reported in the graphs of FIG. 6 were measured in a trial with 3.3 bar pressure cold and warm water, with the water freely flowing and with an initial temperature of 15° C. for the cold water and 70° C. for the warm water. The pivot or adjustment swing angle in degrees is illustrated on the abscissa, while on the right ordinate the temperature of the mixed water in Celsius degrees and on the left ordinate the water flow in liters per minute are illustrated.

Curve 5 shows the dependence of the temperature of the mixed water on the adjustment swing angle, while curves 6 and 7 show the flow rate of the flowing cold and warm water.

As is apparent, the pivot angle change for a temperature change of the mixed water from 30° to 45° C. amounts to 28°. Similarly in FIG. 7 the mixing behavior of the previously described valve as shown, wherein the inlet passage openings 21 and 22 are displaced about a distance 28 of a millimeter. With the same trial conditions, as were used for the case of FIG. 6, with a central displacement and lever 42 is pivoted about 34° for a change of temperature from 30° to 45° C., as is apparent from the graph. The so-called comfort zone comprises, therefore, about a 34° range, wherein the maximum pivot angle of the mixing valve amounts to 110°.

My invention is not to be considered limited to the described example, but also can be realized in a mixing valve, in which a mixed water rear flow is not provided through the valve seat disk. For example, the transfer passage 31 can be radially extended from the controlling disk or coaxially through the controlling disk. In the latter embodiment the transfer passage 31 can be limited to an approximately sickle shaped passage opening with circular front edges.

I claim:

1. In a mixing valve for sanitary conditions comprising a valve seat disk having two inlet passage openings, and a controlling disk held against said valve seat disk adjustable by a handle, the relative proportions of the fluids mixed being controlled by rotation of said controlling disk and the total flow rate of the mixed fluid being controlled by a displacement of said controlling disk, wherein said two inlet passage openings for said fluids mixed are formed symmetrically in one half of said valve seat disk, each of said two inlet passage openings being formed as an arcuate segment on a circular arc, and wherein a transfer passage formed in said controlling disk is brought into overlapping relation with said inlet passage openings adjacent an arc shaped front edge of said transfer passage, the improvement wherein the innert sides of each of said inlet passage openings have a constriction extending a distance of substantially one third of the length of said arcuate segment, and said constriction is positioned a distance of substantially 0.4 of said length of said arcuate segment from the front side of said inlet passage opening proximal to the symmetry axis of said valve seat disk.

2. The improvement according to claim 1 wherein said valve seat disk is substantially circular and the centers of curvature of both of said inlet passage openings are identical and displaced a distance from the center of said valve seat disk on the other opposing half of said controlling disk in a direction parallel to said symmetry axis.

3. The improvement according to claim 2 wherein each of said inlet passage openings at said front side adjacent said symmetry axis has a maximum thickness and is constricted in the direction of the other opposing side of said inlet passage opening, wherein said other opposing sides of both of said inlet passage openings have a thickness, which is substantially 0.75 of said maximum thickness, and the thickness of said constriction of a narrowed shape is substantially 0.5 to 0.3 of said maximum thickness.

4. The improvement according to claim 3 wherein said centers of curvature of both of said inlet passage openings are displaced substantially 1 mm from said center of said valve seat disk, and the radius of said arcuate segment of each of said inlet passage openings is substantially 13 mm, wherein both of said front sides of said inlet passage openings form a semicircle on the outer edges thereof, and each of said arcuate segments corresponding to each of said inlet passage openings extend from 5° to 75° of arc measured from said symmetry axis, and said maximum thickness is substantially 3.6 mm.

5. The improvement according to claim 4 wherein said valve seat disk has an outlet passage opening for the rearward flow of said mixed fluid, and said controlling disk, in which said transfer passage is formed as a surface passage for connecting selectively said inlet passage openings and said outer passage opening, wherein said transfer passage has a trapezoidally shaped longitudinal cross section, which is narrowed in the direction of said outlet passage opening.

6. The improvement according to claim 5 wherein the maximum breadth of said transfer passage is substantially 15 mm and said arc shaped front edge of said transfer passage has a radius of substantially 10 mm, whose corners are rounded with a radius of substantially 2.5 mm, and the maximum distance to the pivot axis from said arc shaped front edge of said transfer passage is substantially 9.5 mm, wherein the side walls of said transfer passage are connected to said front edge with an inclination of substantially 7.5° to the center axis of said controlling disk.

* * * * *